United States Patent [19]
Fredriksen

[11] Patent Number: 5,643,122
[45] Date of Patent: Jul. 1, 1997

[54] POWER TRANSMISSION WITH 5-STAGE PLANETARY GEAR UNIT

[75] Inventor: Nils Fredriksen, Harsewinkel, Germany

[73] Assignee: Claas Kommanditgesellschaft auf Aktien, Harsewinkel, Germany

[21] Appl. No.: 565,067

[22] Filed: Nov. 30, 1995

[30] Foreign Application Priority Data

Dec. 5, 1994 [DE] Germany .......................... 44 43 267.4

[51] Int. Cl.⁶ ................................................. F16H 47/04
[52] U.S. Cl. ....................................................... 475/80
[58] Field of Search ........................................ 475/72, 80

[56] References Cited

U.S. PATENT DOCUMENTS 4,976,664  12/1990  Hagin et al. .............. 475/805
5,496,223  3/1996  Jarchow ..................... 475/80

FOREIGN PATENT DOCUMENTS 4323358  5/1994  Germany .

*Primary Examiner*—Dirk Wright
*Attorney, Agent, or Firm*—Michael J. Striker

[57] ABSTRACT

A power transmission has a 5-stage planetary transmission unit having first, second, third, fourth and fifth transmission shafts, a reverse mechanism and a coupling through which the first transmission shaft is connectable with a drive, a hydrostatic adjusting mechanism through which the second transmission shaft is connectable to the drive, and stage gears and associated stage couplings arranged so that the third, the fourth, and the fifth transmission shafts are each connected with a power take off through a respective one of the stage gears and the stage couplings. The hydrostatic adjusting mechanism is connectable through the reverse transmission and the coupling to the drive.

13 Claims, 5 Drawing Sheets

|    | R | V | K1 | K2 | K3 | K4 | K5 |
|----|---|---|----|----|----|----|----|
| R5 | X |   |    |    |    |    | X  |
| R4 | X |   |    |    |    | X  |    |
| R3 | X |   |    |    | X  |    |    |
| R2 | X |   |    | X  |    |    |    |
| R1 | X | X |    |    |    |    |    |
| N  | X |   |    |    |    |    |    |
|    |   | X |    |    |    |    |    |
| V1 |   | X | X  |    |    |    |    |
| V2 |   | X |    | X  |    |    |    |
| V3 |   | X |    |    | X  |    |    |
| V4 |   | X |    |    |    | X  |    |
| V5 |   | X |    |    |    |    | X  |

Fig. 5

POWER TRANSMISSION WITH 5-STAGE PLANETARY GEAR UNIT

BACKGROUND OF THE INVENTION

The present invention relates to a power transmission with a 5-stage planetary gear unit.

More particularly, it relates to a power transmission with a planetary gear unit with a first transmission shaft connectable with a drive through a reverse mechanism and a coupling, a second transmission shaft connected through hydrostatic adjusting mechanism with the drive, and third, fourth and fifth transmission shafts connected with at least one power take-off through a corresponding toothed gear transmission stage and an associated gear shift coupling.

Such a power transmission is disclosed for example in the German document DE-C1-43 23 358. In this transmission the hydrostatic adjusting mechanism is always coupled at the input side with the drive unit, and from it the planetary gear unit is controlled on the one hand which on the other hand is coupled through the reverse coupling with the drive unit. Thereby the adjusting mechanism runs idly, or in other words when no gear stage is introduced and the coupling is not actuated, always with the swinging-in adjusting unit. During starting first the reverse coupling is turned on and simultaneously the hydrostatic adjusting unit fully swings out, so that at the planetary gear unit a balance of both drive units is provided, or in other words a so-called regulated zero point is obtained, and a vehicle connected at the output side is stopped. During turning back of the adjusting unit the vehicle starts the drive in correspondence with the rotary speed difference of the planetary gear unit. This obtaining of the parallelity of the coupling-in step and swinging-out of the adjusting unit, or in other words holding of the regulated zero point, poses high requirements to the electronic control of the associated adjusting means. The angle acceleration steps which for the different adjusting means actuate with respect to the power pickup must be brought completely parallel since in the event of a timely different engagement of the reverse coupling when compared with the swinging step, a power pickup can be performed in a not desired direction which endangers the safety and is completely unacceptable, in particular for vehicles. The further disadvantage is that during reversing the adjusting unit in standstill must be adjusted to the opposite extreme position so that for reversing takes unacceptably long time.

SUMMARY OF THE INVENTION

Accordingly, it is an object of the present invention to provide a power transmission which avoids the disadvantages of the prior art.

More particularly, it is an object of the present invention to provide a power transmission in which a reliable starting a fast reversing can be provided with reduced control expenses.

In keeping with these objects and with others which will become apparent hereinafter, one feature of the present invention resides, briefly stated, in a power transmission in which the hydrostatic adjusting mechanism to the inlet side is connected with the drive unit through the reversing mechanism and the coupling.

The crux of the invention is that the hydrostatic adjusting mechanism is not permanently connected with the drive unit but instead is connected behind the reversing mechanism and the start reversing coupling as the direct input of the planetary transmission unit or in other words always has a synchronous and phase identical drive. A synchronous regulation of the adjusting unit during start coupling and its change from one extreme position to the other during reversing are dispensed with.

Preferably the start and reverse coupling is a so-called wet multi-plate coupling. Therefore during starting and reversing higher drive regions can be obtained which serves for substantial safety and easy operation.

Depending on the application the transmission can be formed with insignificant changes as four stage transmission or five stage transmission.

In order to simplify the construction all stage couplings are arranged, therefore the accompanying inertia moment of the coupling shaft is extraordinarily small. For a four stage transmission the couplings can include only two coupling pairs each with a three position control, while for the five stage transmission it suffices to provide only one further individual coupling.

The whole transmission unit is arranged very compact in a block housing. The hydrostatic adjusting mechanism with parallel axles is located centrally and the planetary transmission unit is arranged coaxially with a constant unit. The input shaft and the coupling shaft are arranged at both sides of the adjusting mechanism substantially in its plane of symmetry and serve conventionally as main power take off shaft.

In accordance with a further embodiment of the invention a proportional power take off shaft is arranged in the above mentioned plane of symmetry and connected with the coupling shaft, preferably through a power take off coupling.

The main output shaft serves for example for the rear wheel drive of a vehicle and the connectable proportional take off shaft serves for the front wheel drive and the front wheels and rear wheels usually have different diameters. The input shaft preferably extends from the block housing at both sides. Therefore it is connectable on one side with a crankshaft of a drive motor, and on the other side operates as a power take off shaft.

The small compact construction of the inventive power transmission is especially suitable for so-called frame assembly tractors and block assembly tractors.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 5 is a view showing a coupling diagram of the 5-stage transmission in accordance with the present invention.

DESCRIPTION OF THE PREFERRED EMBODIMENTS

Figure 1:
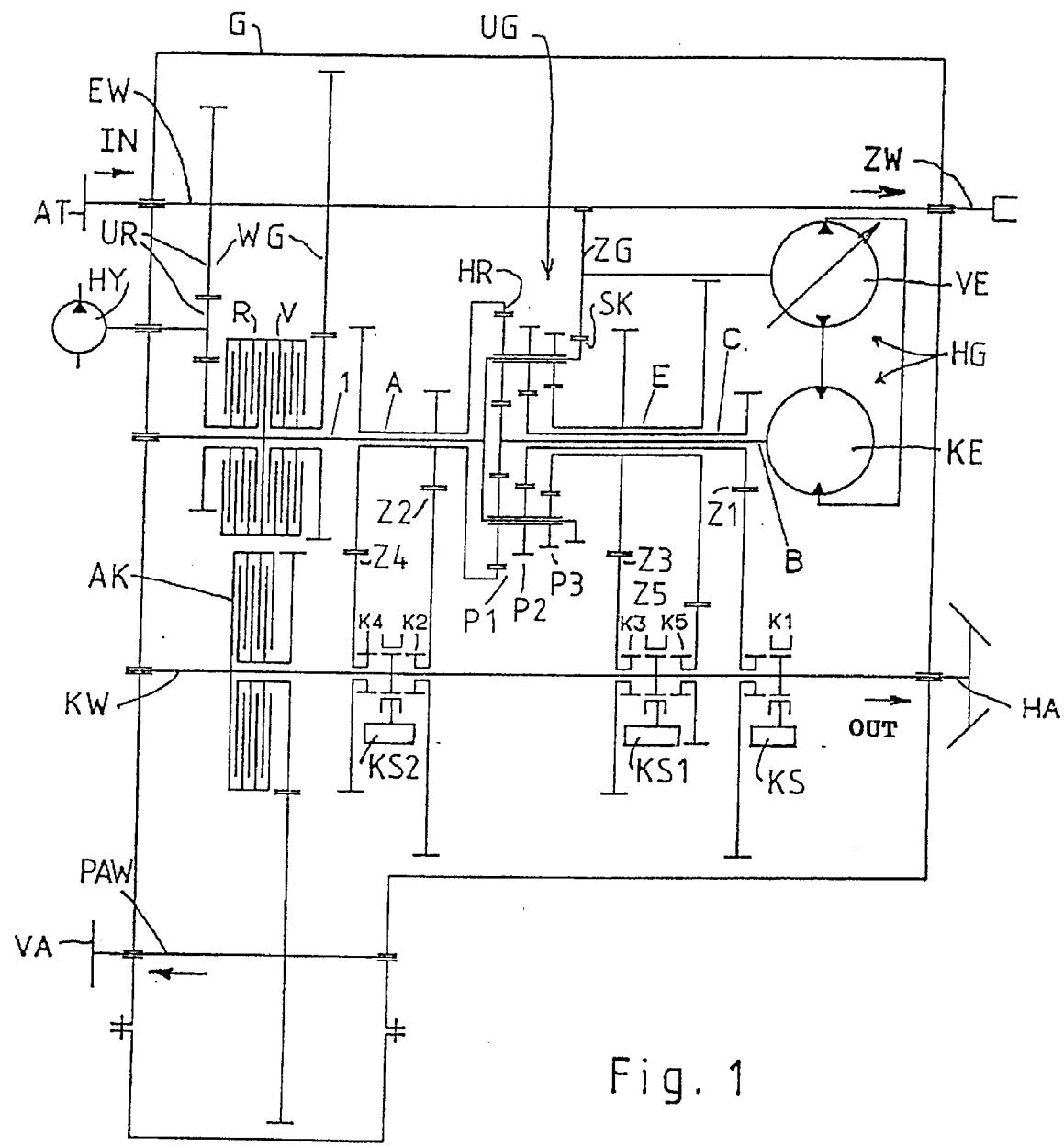
FIG. 1 is a view showing a diagram of a 5-stage power transmission in accordance with the present invention.

FIG. 1 shows a 5-stage transmission which is formed by a planetary transmission unit UG which at a drive side is connected with a web gear shaft 1 and at the other side is connected with a hydrostatic adjusting mechanism HG through a sun gear shaft. At the take off side three hollow shafts A, C, E are provided on the planetary transmission unit UG. Two of these hollow shafts are connected with further sun gears, and one hollow shaft is connected with a hollow gear HR of another planetary stage P1. The planetary transmission unit UG contains total three planetary stages P1, P2, P3. A reverse coupling R, V is located before the web gear shaft. It is connected through a reverse mechanism WG with an input shaft EW which is controlled by a drive AT, for example an internal combustion engine. The reverse mechanism WG includes reverse gears UR for the reverse driving. A hydraulic supply source HY is coupled outside of the housing G with one of the reverse gears UR.

A web wheel toothed rim SK is mounted on the web gear and engages with a toothed gear ZG which controls the adjusting unit of the hydrostatic mechanism HG. The constant component KE of the hydrostatic adjusting mechanism HG controls the inner sun gear shaft B of the first planetary stage P1.

A coupling KW is further supported in the housing G, and couplings K1–K5 of five stages are arranged on the coupling shaft. The gears Z1–Z5 for the five stages are each connected on the one hand with one of the hollow shafts A, C, E of the planetary transmission unit UG and on the other hand supported with the associated coupling part on the coupling shaft KW. Advantageously, one individual coupling is provided for the first stage, whose hollow shaft C stands still in the start condition during starting. Furthermore, two coupling pairs K3, K5; K2, K4 are provided for the corresponding stages Z3, Z5; Z2, Z4. Both coupling pairs have each three-position adjusting devices KS1, KS2 whose neutral position is located centrally between both coupling positions. The first stage has only a simple coupling actuator KS. The arrangement of all stage couplings K1–K5 in series on one shaft, provide for a construction which is simple and ease to monitor.

The power take off AUS is carried out for example by the coupling shaft KW. It leads to the rear wheels as a main power take off HA when it is used in the power take off of a tractor or a similar vehicle.

Optionally, a further power take off with proportional rotary speed can be provided, in particular on the front wheels of a vehicle. For this purpose a take off coupling AK is provided on the coupling shaft KW, and the proportional take off shaft PAW is controlled from it through a toothed gear. The proportional take off shaft leads in particular to the front wheel drive unit VA of the vehicle.

In a known manner, the input shaft EW can be arranged on a power take off shaft ZW at the other side of the housing G relative to the drive side EIN.

Both inputs of the planetary transmission unit UG are connected behind the reverse coupling R, V. Therefore, after the coupling, the transmission shaft C of the first stage is brought by adjusting of the adjustment element to standstill and then the synchronous coupling is introduced. Also, the further couplings K2–K5 of other stages are synchronous couplings, for example claw couplings, which have a very simple construction and they are always actuated during rotary speed equilibrium on the parts to be coupled. Therefore practically there is wear.

The whole transmission has the minimal losses when the individual stages are brought to the central position, the hydrostatic adjusting mechanism HG runs idle and its power take off shaft stands still.

Figure 2:
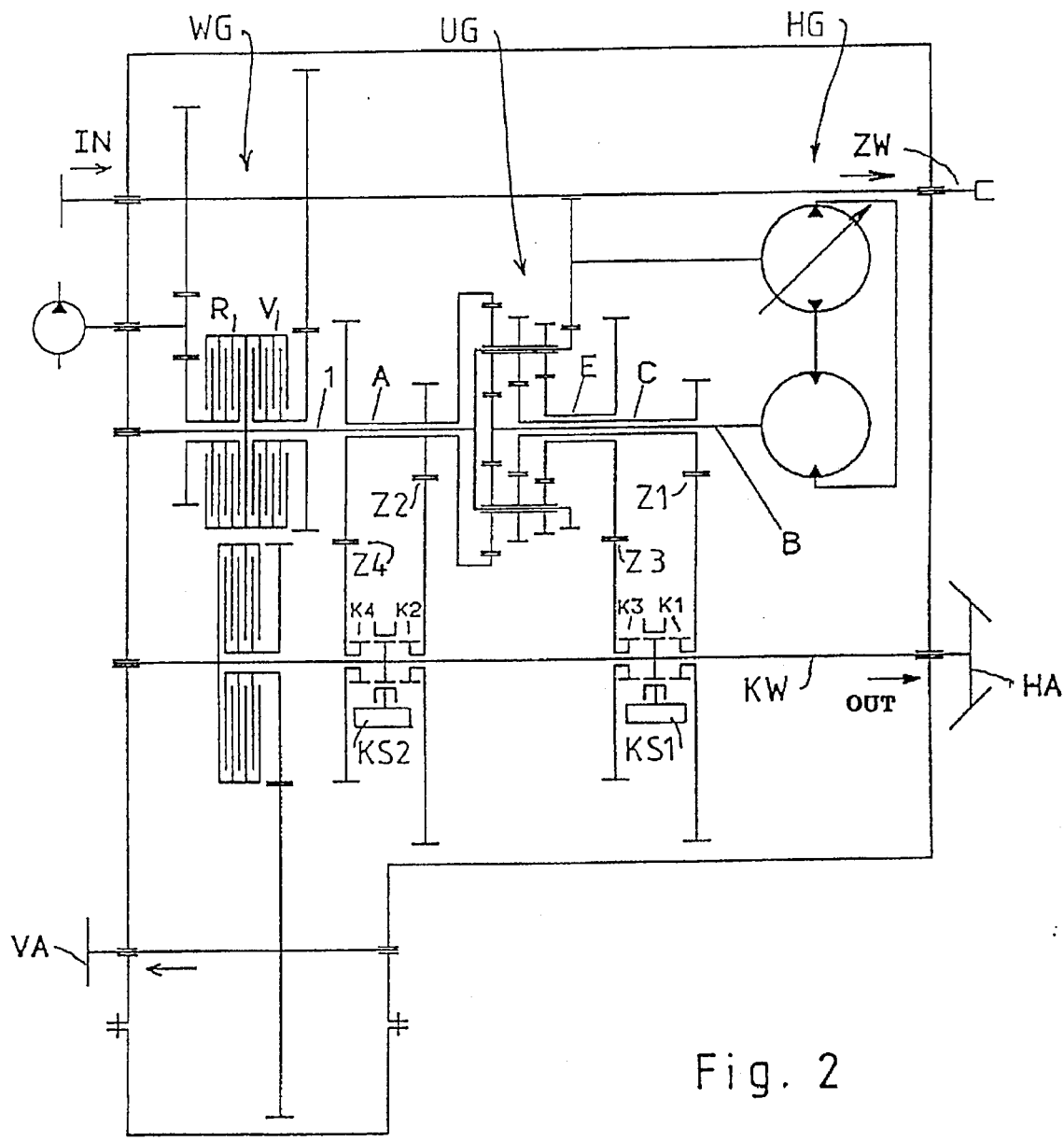
FIG. 2 is a view showing a diagram of a 4-stage power transmission in accordance with the present invention.

FIG. 2 shows a 4-stage transmission which is substantially similar to the above described 5-stage transmission. Therefore, only the differences of these transmissions are described hereinbelow.

Two coupling pairs K1, K3; K2, K4 are arranged on the coupling shaft KW and belong correspondingly to the gears Z1–Z4 of the four stages. The gear Z1 of the first stage is arranged on the hollow shaft C of the planetary transmission unit UG and is driven so that with the introduced start coupling R, W the control of the planetary transmission unit via the web gear shaft 1 and via the sun gear shaft B through the hydrostatic adjusting mechanism HG is located in standstill. The further hollow shaft E of the planetary transmission unit UG leads to the gear Z3 of the third stage, and the further hollow shaft A carries the gears of the second and fourth stages.

The first coupling pair K1, K3 is activated from a 3-position adjusting device with a neutral central position. The second coupling pair K2, K4 is controlled by a second 3-position adjusting device with a neutral central position.

Figure 3:
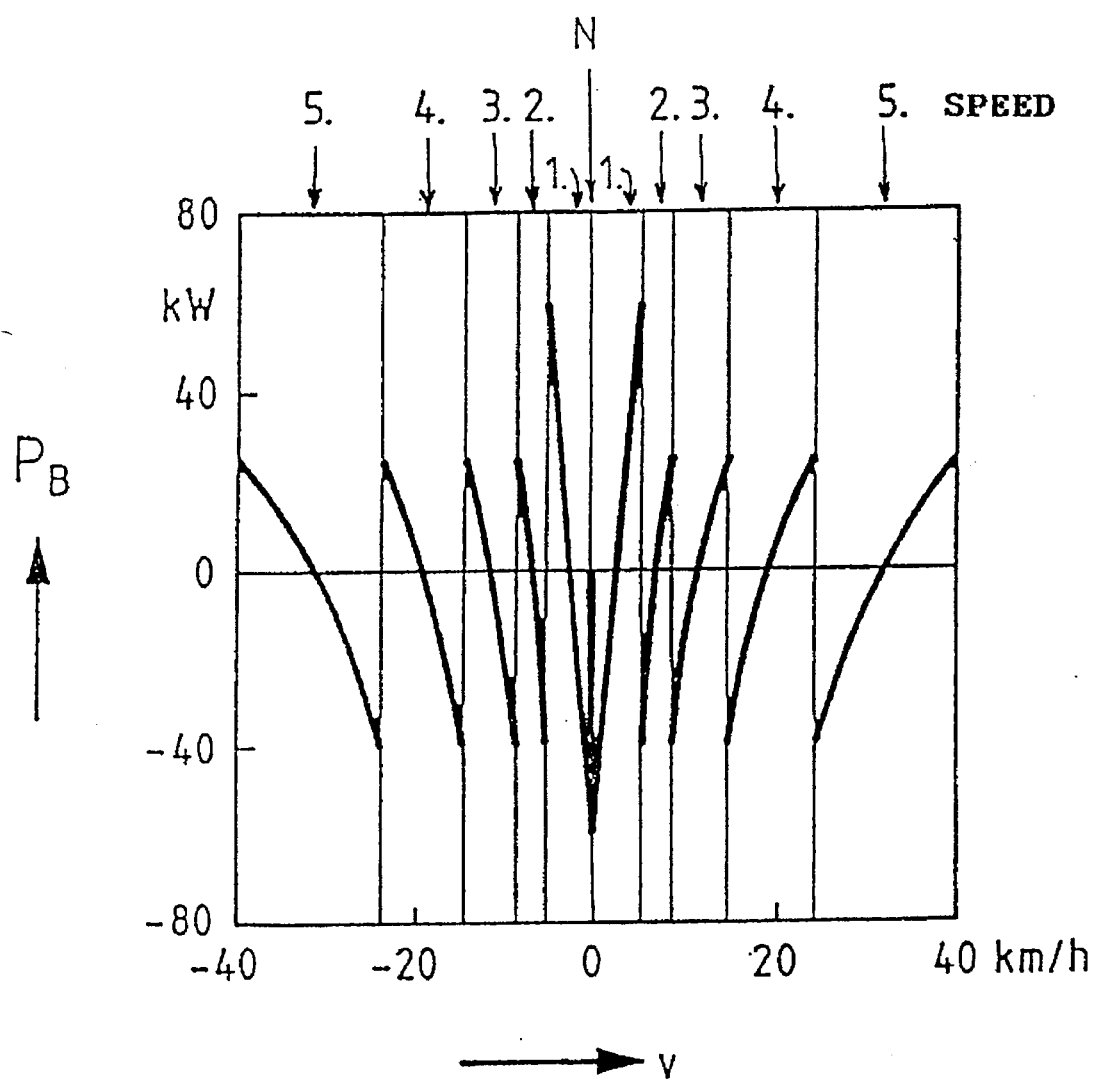
FIG. 3 is a view showing a power flow diagram of a hydrostatic adjusting mechanism through gear stage-speed regions of a vehicle controlled by the transmission.

FIG. 3 shows a diagram for a transmission which is used in a vehicle and is to be driven forward and rearward with the speed v in the stages 1–5. The vertical axis represents the power which is transmitted on the shaft B from the hydrostatic adjusting mechanism HG to the planetary transmission unit. It can be seen that in the neutral position N in which no stages are introduced and also the reverse coupling R, V is not actuated, no power is used.

Figure 4:
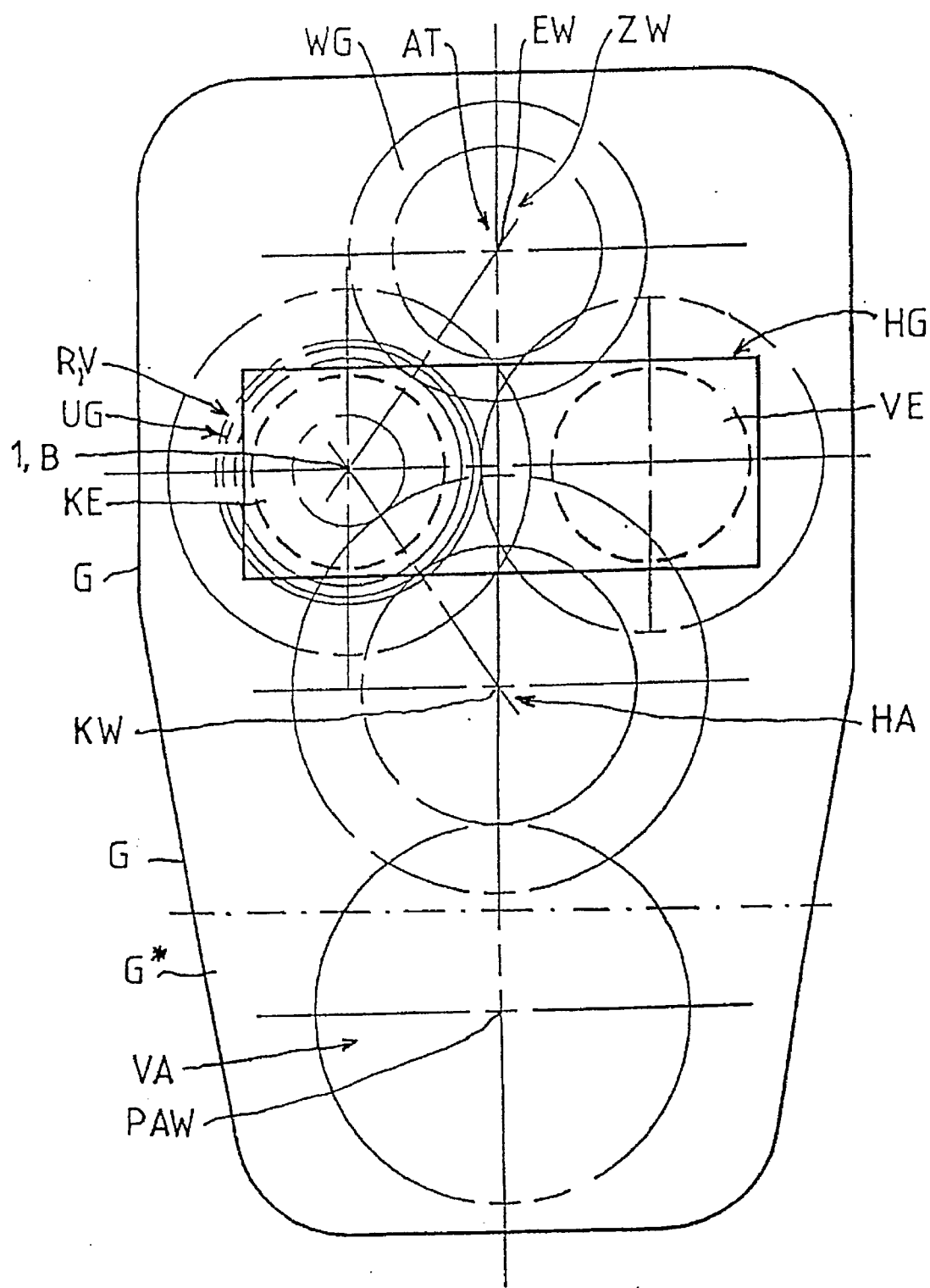
FIG. 4 is an end view of a transmission block with schematic transmission gears.

FIG. 4 shows an advantageous arrangement of the whole transmission unit in a housing G on an end view. In the drawing the hydrostatic adjusting mechanism HG with its adjusting unit VE and its constant unit KE is arranged centrally transversely. Coaxial to the constant unit, there are arranged the reversing coupling R, V and the planetary transmission unit UG with its drive axes 1, B. The input shaft EW on the one hand, and the coupling shaft KW on the other hand are arranged substantially in the symmetry plane between the adjusting unit VE and the constant unit KE at both sides of these units. The input shaft EW extends on the one side to the drive AT and on the other side to the take off shaft ZW and carries the reverse mechanism WG. The coupling shaft KW extends from the housing to the main or rear gear drive HA.

In accordance with a first simple embodiment, the housing G ends at the dash-dot line in the drawing and therefore has an extremely compact block form. As for the proportional drive shaft PAW, it is provided that it leads to a front wheel drive VA formed another wheel diameter, so that the housing is extended outwardly by a housing portion G* beyond the dash-dot line. The proportional drive shaft PAW is supported there preferably in the above mentioned plane of symmetry and carries the associated gear which is connected with the coupling shaft KW through the power take off coupling.

FIG. 5 shows a switching diagram for the individual couplings K1–K5; R, V with the associated forward stages V1–V5 and the rearward stages R1–R5, as well as the neutral position N. As can be seen from the drawing, from the neutral position N the reverse mechanism R, V is turned either with the rearward coupling or with the forward coupling to the neutral position N, and then one of the stage switching couplings K1–K5 is introduced. A control is therefore introduced which takes care of the situation that the couplings are turned on or turned off only in the synchronous position. The transmission is designed so that the hydraulic adjusting mechanism is brought in each stage from one extreme position to another extreme position. Correspondingly limiting passing synchronization for the coupling of the neighboring stage is produced. In particular, in the neutral position N no changeover of the adjusting unit is needed for going from a forward drive to a rearward drive. With the uncoupled reverse gear R, V, no power flows in the transmission UG, HG, since both the planetary transmission unit UG and the hydrostatic element HG are separated from the drive AT.

It will be understood that each of the elements described above, or two or more together, may also find a useful application in other types of constructions differing from the types described above.

While the invention has been illustrated and described as embodied in a power transmission with 5-stage planetary gear unit, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A power transmission, comprising a 5-shaft planetary transmission unit having first, second, third, fourth and fifth transmission shafts; a reverse mechanism and a coupling through which said first transmission shaft is connectable with a drive; a hydrostatic adjusting mechanism through which said second transmission shaft is connectable to said drive; and stage gears and associated stage couplings arranged so that said third, said fourth, and said fifth transmission shafts are each connected with a power take off through a respective one of said stage gears and said stage couplings, said hydrostatic adjusting mechanism being connected through said reverse mechanism and said coupling to the drive.

2. A power transmission as defined in claim 1, wherein said first transmission shaft is a web wheel shaft, said second transmission shaft being a sun wheel shaft of a first planetary stage of said planetary transmission unit, said hydrostatic adjusting unit having an adjusting element connected by a gear to said web gear shaft.

3. A power transmission as defined in claim 2, wherein said gear has a web gear toothed rim.

4. A power transmission as defined in claim 1, wherein said third transmission shaft is a hollow shaft arranged on said web gear shaft and driven through a hollow gear of a first planetary stage of said planetary transmission unit, said fourth transmission shaft being a hollow shaft arranged on said second transmission shaft and driven by a sun gear of a second planetary stage of said planetary transmission unit, said fifth transmission shaft being a hollow shaft supported on said fourth transmission shaft and connected with a sun gear of a third planetary stage of said planetary transmission unit.

5. A power transmission as defined in claim 1, for a 4-stage transmission wherein said transmission is formed as a four-stage transmission; and further comprising a 3-position adjusting device, said couplings including two coupling pairs arranged on a coupling shaft and actuatable through said adjusting device, said couplings including a first coupling of a first stage connected with a first one of said stage gears which is connected with said third transmission shaft, and a third coupling of the same coupling pair being connected with a stage gear of a third stage which is connected with said fifth transmission shaft.

6. A power transmission as defined in claim 1, for a 5-stage transmission, wherein said couplings include a first coupling of a first stage which is connected through a first one of said stage gears of the first stage with said third transmission shaft, and a second coupling and a fourth coupling of a second coupling pair are each connected with an associated one of said stage gears of said second and said fourth stages which are connected with said third transmission shaft.

7. A power transmission as defined in claim 1; and further comprising a coupling shaft; a main power take off directly connected said coupling shaft; a proportional power take off shaft; a gear stage through which said coupling shaft is connected to said proportional power take off shaft; and a power take off connected to said proportional power take off shaft.

8. A power transmission as defined in claim 7; and further comprising a power take off coupling connecting said coupling shaft with said gear stage.

9. A power transmission as defined in claim 1; and further comprising a block housing, said hydrostatic adjusting mechanism has an adjusting unit and a constant unit having parallel axes, said planetary transmission unit being coaxially connected with said constant unit, while an input shaft of said drive and a coupling shaft being arranged symmetrically at both sides of said adjusting mechanism substantially in its plane of symmetry so that said adjusting mechanism is located between said adjusting unit and said constant unit.

10. A power transmission as defined in claim 9; and further comprising a proportional power take off shaft arranged in said plane of symmetry and connected with said coupling shaft.

11. A power transmission as defined in claim 9, wherein said input shaft extends outwardly beyond said block housing at both sides, so that the drive can be connected with its one side and a power take off connection can be connected with its another side.

12. A power transmission as defined in claim 1, wherein said coupling is a reversing coupling having two coupling regions each driven forwardly or rearwardly by said reverse mechanism.

13. A power transmission as defined in claim 1, wherein said reversing coupling is a wet plate coupling, said stage couplings being synchronous couplings.

* * * * *